United States Patent
Miyasaka et al.

(10) Patent No.: US 6,766,362 B1
(45) Date of Patent: Jul. 20, 2004

(54) PROVIDING A NETWORK-BASED PERSONALIZED NEWSPAPER WITH PERSONALIZED CONTENT AND LAYOUT

(75) Inventors: Hitoshi Miyasaka, Mountain View, CA (US); Toshio Tanaka, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 477 days.

(21) Appl. No.: 09/627,350

(22) Filed: Jul. 28, 2000

(51) Int. Cl.⁷ .............................................. G06F 15/16
(52) U.S. Cl. .................. 709/219; 709/246; 715/517; 715/520; 715/532; 715/513
(58) Field of Search ............................ 709/246, 219; 345/744–747; 707/517–525; 715/532, 517, 520, 513

(56) References Cited

U.S. PATENT DOCUMENTS

| 5,241,671 A | * | 8/1993 | Reed et al. | 707/104.1 |
| 5,339,392 A | * | 8/1994 | Risberg et al. | 345/762 |

(List continued on next page.)

FOREIGN PATENT DOCUMENTS

| EP | 1014255 A2 | * | 6/2000 | G06F/3/12 |
| NZ | 328281 A | * | 2/1998 | B42D/7/00 |

OTHER PUBLICATIONS

Kamba et al., "Anatagonomy: a personalized newspaper on the World Wide Web", International Journal of Human–Computer Studies, Jan. 1, 1997, vol. 46, pp. 789–803.*

Sakagami et al., "Learning personal preferences on online newspaper articles from user behaviors", Computer Networks and ISND Systems vol. 29, 1997, pp. 1447–1455*

Sakagami et al., "Effective personalizeation of push–type systems—visualizing information freshness", Computer Networks and ISDN Systems vol. 30, Apr. 7, 1998, as printed from http://www7.scu.edu.au/programme/fullpapers/1871/com1871.*

Elliott, "The Asian online newspaper", Media Asia, 1999, vol. 26, Issue 3, pp. 123ff.*

Kamba et al., Automatic Personalization on Push News Service, NEC Corporation, Sep. 8, 1997, from www.w3.org/Architecture/9709_Workshop/paper02/paper02.ppt.*

Business Wire, "HP Announces HP Instant Delivery Software for Convenient, Unattended Web Printing", Business Wire, New York, Oct. 7, 1998, pp. 1ff.*

Business Wire, "HP Instant Delivery and the New York Times on the Web Pioneer Digital Delivery of Personalized News Content", Business Wire, New York, Oct. 19, 1999, pp. 1ff.*

(List continued on next page.)

*Primary Examiner*—Glenton B. Burgess
*Assistant Examiner*—Bradley Edelman
(74) *Attorney, Agent, or Firm*—Mark P. Watson

(57) ABSTRACT

A computer network server provides a customized newspaper to a recipient according to recipient profile preferences. The server searches for and obtains article content that is deemed to be of greatest interest to the recipient according to topical preferences, generates a representation of the selected content according to a layout preference, and delivers the representation to the recipient according to a designated schedule. Recipient preferences are received and stored in a profile database using facilities that assist a recipient to specify preferred topics, newspaper layout, delivery schedule and destination. Topical designations are mapped into hierarchical structures that facilitate searching content databases. Newspaper articles are arranged according to relative priorities of designated topics.

45 Claims, 9 Drawing Sheets

U.S. PATENT DOCUMENTS

| | | | | |
|---|---|---|---|---|
| 5,579,471 | A | * 11/1996 | Barber et al. | 345/700 |
| 5,584,025 | A | 12/1996 | Keithley et al. | |
| 5,615,325 | A | 3/1997 | Peden | |
| 5,649,186 | A | 7/1997 | Ferguson | |
| 5,704,017 | A | 12/1997 | Heckerman et al. | |
| 5,717,923 | A | 2/1998 | Dedrick | |
| 5,721,908 | A | 2/1998 | Lagarde et al. | |
| 5,754,939 | A | 5/1998 | Herz et al. | |
| 5,758,257 | A | 5/1998 | Herz et al. | |
| 5,761,662 | A | 6/1998 | Dasan | |
| 5,793,972 | A | 8/1998 | Shane | |
| 5,835,087 | A | 11/1998 | Herz et al. | |
| 5,862,325 | A | 1/1999 | Reed et al. | |
| 5,893,127 | A | * 4/1999 | Tyan et al. | 715/513 |
| 5,918,013 | A | * 6/1999 | Mighdoll et al. | 709/217 |
| 5,948,061 | A | * 9/1999 | Merriman et al. | 709/219 |
| 5,951,300 | A | 9/1999 | Brown | |
| 5,978,807 | A | 11/1999 | Mano et al. | |
| 5,978,833 | A | 11/1999 | Pashley et al. | |
| 5,991,735 | A | 11/1999 | Gerace | |
| 5,999,526 | A | 12/1999 | Garland et al. | |
| 6,029,182 | A | * 2/2000 | Nehab et al. | 715/523 |
| 6,029,195 | A | 2/2000 | Herz | |
| 6,157,924 | A | 12/2000 | Austin | |
| 6,182,066 | B1 | 1/2001 | Marques | |
| 6,202,093 | B1 | 3/2001 | Bolam et al. | |
| 6,243,761 | B1 | * 6/2001 | Mogul et al. | 709/246 |
| 6,269,361 | B1 | * 7/2001 | Davis et al. | 707/3 |
| 6,278,449 | B1 | * 8/2001 | Sugiarto et al. | 345/826 |
| 6,345,274 | B1 | * 2/2002 | Zhu et al. | 707/5 |
| 6,381,362 | B1 | * 4/2002 | Deshpande et al. | 382/162 |
| 6,412,008 | B1 | * 6/2002 | Fields et al. | 709/228 |
| 6,421,733 | B1 | * 7/2002 | Tso et al. | 709/246 |
| 6,448,980 | B1 | * 9/2002 | Kumar et al. | 345/745 |
| 6,456,305 | B1 | * 9/2002 | Qureshi et al. | 345/800 |
| 6,542,173 | B1 | * 4/2003 | Buckley | 345/841 |
| 6,549,220 | B1 | * 4/2003 | Hsu et al. | 345/854 |
| 6,564,250 | B1 | * 5/2003 | Nguyen | 709/208 |
| 6,564,251 | B2 | * 5/2003 | Katariya et al. | 709/214 |
| 6,665,838 | B1 | * 12/2003 | Brown et al. | 715/501.1 |
| 6,684,369 | B1 | * 1/2004 | Bernardo et al. | 715/513 |
| 2001/0042081 | A1 | * 11/2001 | MacFarlane et al. | 707/513 |
| 2002/0007383 | A1 | * 1/2002 | Yoden et al. | 707/536 |
| 2002/0152245 | A1 | * 10/2002 | McCaskey et al. | 707/530 |
| 2003/0231335 | A1 | * 12/2003 | Walsh et al. | 358/1.15 |

OTHER PUBLICATIONS

Perez, "Hewlett–Packard: Enhanced HP Instant Delivery Web site redefines 'Grab and Go' Internet information", M2 Presswire, Ociober 20, 1999, pp. 1ff.*

PR Newswire, "Datalogics Announces Agreement With HP to Enhance HP Instant Delivery Personalized News and Information Service", PR Newswire, New York, Jan. 12, 2000, pp. 1ff.*

* cited by examiner

Print your own customized newspaper
If you are already registered,
    enter your user id here:
    and your password here:
then click "GO" to seecurrent preferences. GO
If you are not already registered and would like to register for a new subscription, click here. START
Fig. 5A
Step 1
Select up to six news topics in order of interest.
  
  
Click here to CONTINUE
Fig. 5B

Step 2
You may specify subtopics and keywords to refine your selected topics:
| You selected these topics: | You may select subtopics . . . | and keywords |
|---|---|---|
| 1. Domestic | Subtopic 1 ▼ | |
| 2. Sports | Subtopic 2 ▼ | |
Click here to CONTINUE
Fig. 5C
Step 3
Select the layout you prefer.
☐     ☒     ☐     ☐
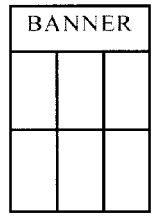
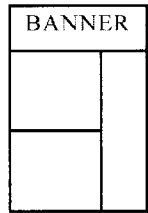
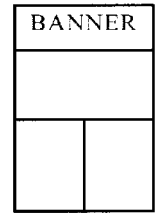
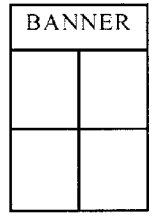
Select a font size for the text: Text Size ▼
Click here to CONTINUE
Fig. 5D

Step 4

Specify when you wish to receive your newspaper:

- ☐ Daily
- ☐ Weekly [Day ▼]
- ☒ Weekdays (M-F)
- ☐ Weekend (Sat, Sun)

Specify [Time ▼] and [Time Zone ▼]

Click here to [CONTINUE]

Fig. 5E

Step 5

Specify where to deliver your newspaper by entering your e-mail address: [_____]

Enter a user id [_____]
and a password [_____]

so you can log in and change your subscription whenever you wish.

Click here to [CONTINUE]

Fig. 5F

Current Preferences

Review your current preferences and change them if you wish:

Topics:       Subtopics:              Key words:

1. Domestic   Agriculture, Weather    water, rice, ...
2. Sports     Basketball              NBA, NCAA Click here to [Change Topics]

Layout: 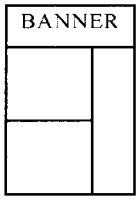 with medium font size.

Click here to [Change Layout]

Schedule:   Week days (M-F)   at   8:30 am   PST

Click here to [Change Schedule]

Delivery:   by e-mail to: abc@xyz.com

Click here to [Change Delivery]

Account:

Your user id is: Jin
Your password is: ******

Click here to [Change Account]

Click here to [REGISTER] or [CANCEL]

Fig. 5G

PROVIDING A NETWORK-BASED PERSONALIZED NEWSPAPER WITH PERSONALIZED CONTENT AND LAYOUT

TECHNICAL FIELD

The present invention pertains generally to the use of computer networks, and pertains more particularly to improved ways to access and distribute information to specific recipients through computer networks.

BACKGROUND ART

Prior to the wide spread use of global computer networks, many individuals relied on media like newspapers and radio and television broadcasts to obtain "news" or information about rapidly changing situations and current events. Today, global computer networks such as the Internet provide an additional source of information. For some individuals, computer network sources have eclipsed the importance of the older, more traditional media because these networks are capable of supporting extremely rapid publication of large amounts of information. As a result, individuals may be given ready access to information from essentially any source throughout the world.

This has proven to be a mixed blessing. On one hand, having access to large amounts of information is better than having access to only a restricted subset of this information; more is better. On the other hand, the volume of available information has grown to such an extent that most individuals are overwhelmed by the amount of work required to find or identify information of particular interest. It is no longer feasible for individuals to find information by merely perusing global computer networks to discover what exists.

A number of techniques have been developed in an attempt to solve this problem. One class of techniques "pulls" information to an individual in response to a request. Network facilities called "search engines" assist in the task of finding information by searching for documents and other elements of information that are deemed to satisfy one or more search criteria provided by an individual, and then allowing the individual to request or "pull" selected information from its source. Facilities called "meta search engines" provide an additional level of support by invoking multiple search engines in search of requested information.

Another class of techniques "pushes" information to an individual in response to a request. Facilities known as "robots" or "agents" assist in the search for information by first identifying information that is pertinent to one or more criteria specified by an individual, and then causing that information to be sent or "pushed" to the individual.

Although these techniques have achieved some degree of success in finding information, they have not provided facilities for presenting this information in a form that has desirable features like the easily readable layout of a traditional newspaper.

DISCLOSURE OF INVENTION

It is an object of the present invention to provide a computer-network based newspaper having content that can be selected and presented in a form according to personal preferences of an individual recipient.

According to one aspect of the present invention, a personalized presentation of news and information is provided to a recipient by: obtaining from the recipient an indication of one or more preferred categories and a preferred presentation layout; identifying a plurality of documents having content deemed to be relevant to the one or more preferred categories; obtaining content information representing at least part of the content of the identified documents; and generating a representation of articles including the content information such that a presentation of the representation conforms to the preferred presentation layout. Other aspects of the present invention and objects achieved thereby are set forth throughout this disclosure.

The various features of the present invention and its preferred implementations may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIGS. 5A–5G are schematic illustrations of forms that may be displayed on a computer display device to receive individual preferences of a recipient.

MODES FOR CARRYING OUT THE INVENTION

A. Overview

Figure 1:
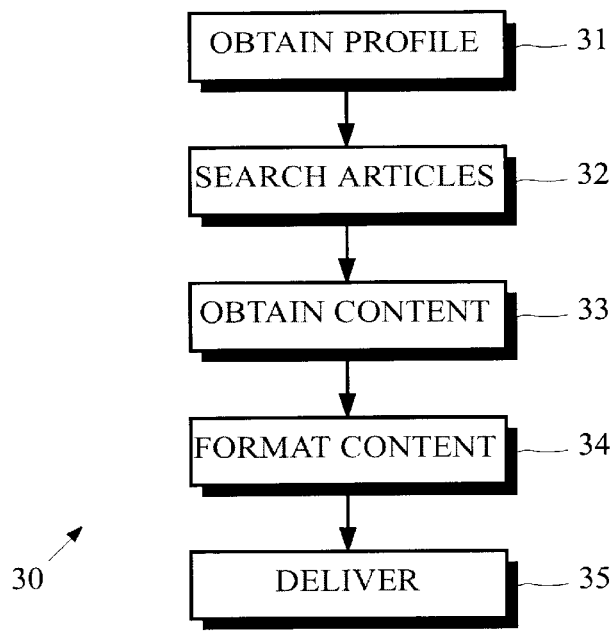
FIG. 1 is a block diagram of a process that may be used to carry out various aspects of the present invention.

FIG. 1 is a block diagram of method 30 that may be used to carry out various aspects of a process that provides a computer-network based newspaper having content that can be selected and presented in a form according to personal preferences of an individual recipient. According to this method, step 31 obtains profile information from the individual that defines that individual's personal preferences. In one implementation, the profile includes indications of desired topics for news articles, a selected layout for presentation, and a schedule for providing the newspaper. In this implementation, step 32 and subsequent steps are performed at times specified by the recipient's chosen schedule. Step 32 searches for documents having content that matches the indications of desired topics, and step 33 obtains the content of the documents identified by the search. Step 34 generates a representation of the content of these documents in a format or layout specified in the recipient's profile. Optionally, method 30 includes step 35 that delivers the representation to a destination specified by the recipient. For example, step 35 may send the generated representation by electronic mail (e-mail) to an address included in the profile.

Figure 2:
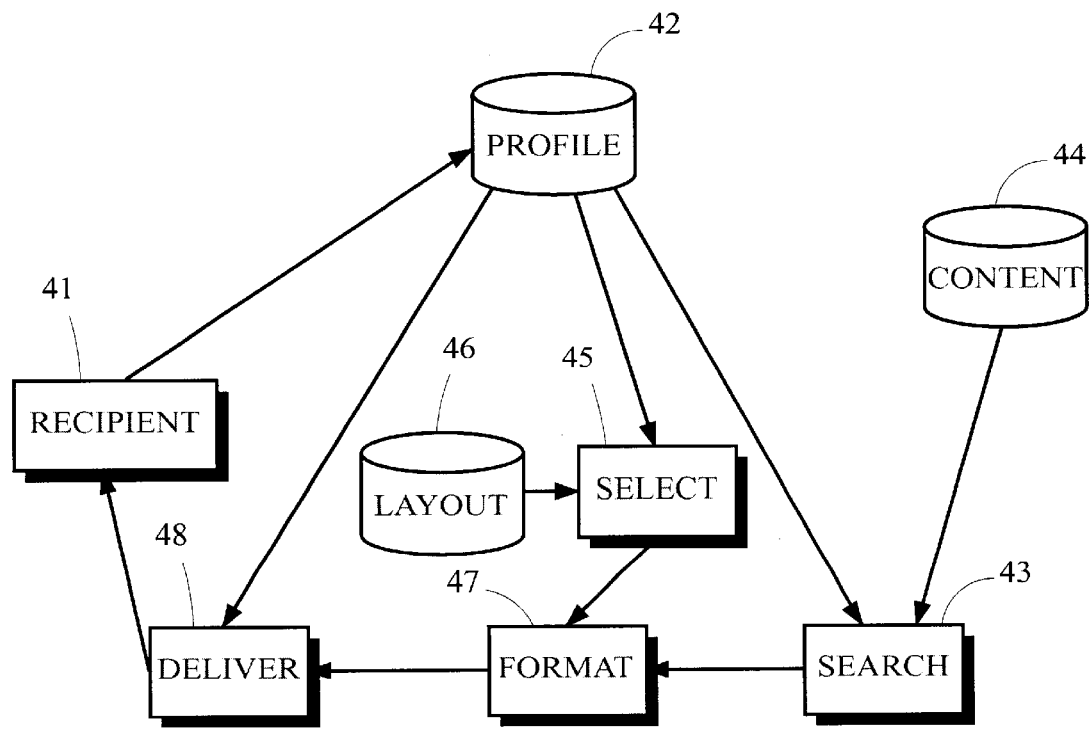
FIG. 2 is a schematic diagram of computer and network components that may be used to carry out various aspects of the present invention.

FIG. 2 is a schematic diagram of computer and network components that may be used to carry out various aspects of the present invention. In the example shown, information received from recipient 41 is used to construct one or more records of recipient preferences in profile database 42. Search 43 identifies documents in content database 44 having content that matches indications of desired topics in the recipient preferences. A representation of the content of those documents identified by the search is generated by format 47 in a form that conforms to a layout selected from layout database 46 by select 45 according to recipient preferences. In a preferred implementation, deliver 48 sends the formatted representation to recipient 41. In an alternative implementation, the representation is stored for delivery to recipient 41 in response to an explicit request.

Figure 3:
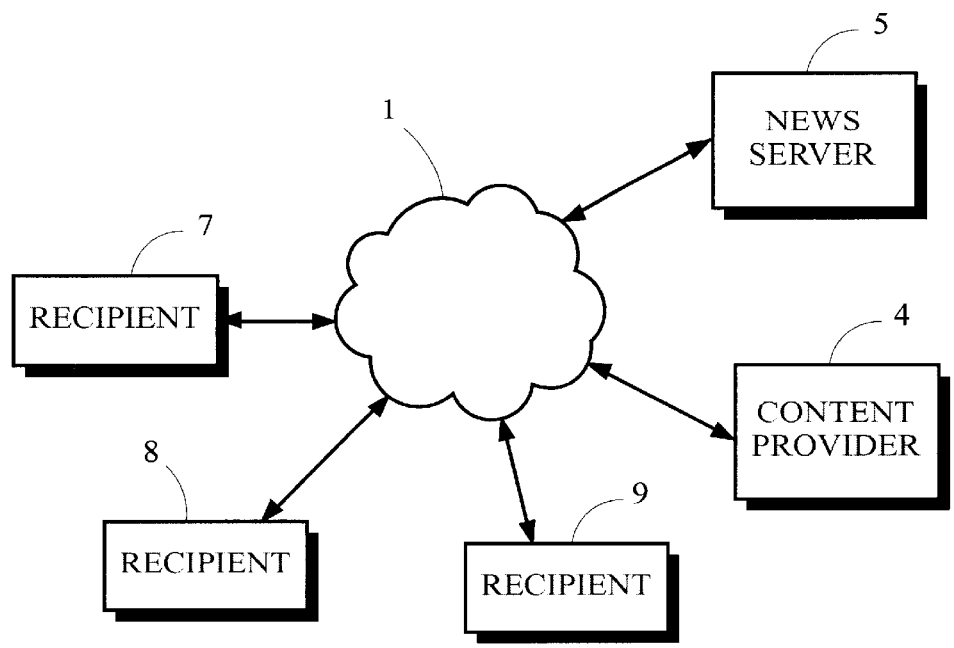
FIG. 3 is a schematic illustration of a computer network.

FIG. 3 provides a schematic illustration of a computer network in which various aspects of the present invention may be carried out. In the example shown, news server 5 performs the services described above and illustrated in FIGS. 1 and 2. News server 5 obtains documents by subscription through network 1 from content provider 4 and stores these documents in content database 44. Alternatively or in addition, news server 5 may search for and obtain the content of individual documents from databases or other repositories that are maintained by content provider 4 or others. News server 5 formats the content of these documents to provide to each recipient computer system 7–9 a representation of a customized newspaper having content that may be presented according to recipient preferences. Optionally, news server 5 may send the representation to each recipient according to individual scheduling preferences.

In a preferred implementation, network 1 is a global network such as the Internet, content provider 4 and news server 5 operate as network servers, and the computer system 7∝9 for each recipient operates as a network client. In alternative implementations, network 1 may be a local or a regional network, or essentially any other type of data-communication facility. The network servers and clients may be implemented by conventional hardware and software such as that discussed below; however, no particular implementation is critical.

Figure 4:
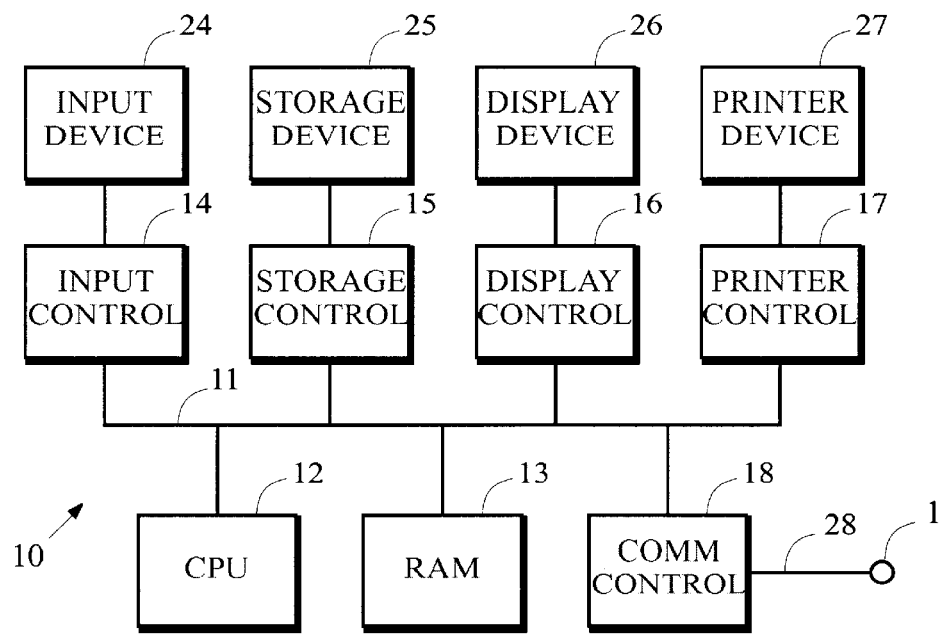
FIG. 4 is a schematic block diagram of a computer system.

FIG. 4 is a schematic block diagram of computer system 10 that may be used to carry out various aspects of the present invention as recipient computer 7–9. A similar computer system may be used to carry out various aspects of the present invention in news server 5. CPU 12 provides computing resources. Input control 14 represents an interface to input device 15 such as a keyboard or mouse. Storage control 15 represents an interface to storage device 25 that includes a storage medium such as magnetic tape or disk, an optical medium or solid-state medium. The storage medium may be used to record programs of instructions for operating systems, utilities and applications such as those that can carry out various aspects of the present invention. Display control 16 provides an interface to display device 26 such as a monitor with a cathode ray tube (CRT) or liquid crystal display (LCD) panel. Printer control 17 provides an interface to printer device 27 such as an ink jet or laser printer. RAM 13 is system random access memory (RAM). Comm control 18 provides an interface to communications link 28, which in turn connects to network 1.

For a network server according to the present invention, computer system 10 may store content, layout specifications, and recipient preferences in storage device 25. Representations of a customized newspaper are sent through comm control 18 to network 1.

For a network client according to the present invention, computer system 10 may receive representations of a customized newspaper through comm control 18 from network 1 and store the representation in storage device 25 for presentation by display device 26 and/or printer device 27.

In the example shown in the figure, all major components of computer system 10 connect to bus 11, which may represent more than one physical bus. For example, some personal computers incorporate only one bus that conforms to the so-called Industry Standard Architecture (ISA) or some variant of ISA. Other computers incorporate an additional bus such as a higher bandwidth bus conforming to some bus standard such as the Peripheral Component Interconnect (PCI) local bus standard. A bus architecture is not required to practice the present invention.

In an alternative apparatus such as one suitable for use as an electronic book, input device 24 could be a set of buttons, storage control/device 15/25 could be some form of solid-state memory, and printer control/device 17/27 could be omitted. Other variations are possible.

The functions of one or more of these components can be implemented in a wide variety of ways including discrete logic components, one or more ASICs and/or program-controlled processors. The type of implementation is not critical.

B. Obtain Profile

Step 31 may obtain recipient profile information in essentially any manner. One way is through one or more forms displayed on computer display device 26 of recipient computer 7–9 that permit an individual to enter information that specifies his or her preferences. Schematic illustrations of a set of forms that may be used are shown in FIGS. 5A–5G.

In a preferred implementation, news server 5 requires an individual to setup a subscription by registering individual information in profile database 42. The form shown in FIG. 5A is one example that allows an individual to register for a new subscription, or to review and modify current preferences for an existing subscription. Forms such as the one shown in this figure as well as the forms shown in other figures may be implemented using a tag-based markup language such as the Hypertext Markup Language (HTML), for example. Other implementations are possible. No particular implementation is critical. In preferred implementations, forms are presented on the screen of display device 26 that guide and assist an individual in using input device 24 to enter and submit information. A wide variety of user interfaces using keyboards, pointing devices and/or touch screens are possible.

Individuals having an existing subscription may review current preferences by entering a "user id" and an associated "password" in the spaces provided and then "clicking" on the "Go" button with a pointing device such as a mouse. In response, news server 5 returns a form such as that shown in FIG. 5G, which gives a registered individual an opportunity to review and modify current preferences. This is discussed in more detail below.

Individuals who wish to register for a new subscription may indicate this by clicking on the "Start" button. In response, news server 5 returns one or more forms that allow the individual to enter personal preferences. Examples are shown in FIGS. 5B to 5G. Each of these examples may be implemented as an individual form, or essentially any combination may be implemented as portions of the same form. The order and content of these forms is not critical.

The schematic illustration in FIG. 5B indicates the first step for registration is to designate one or more topics of interest. Preferably, the form presents to the individual a list of categories from which topics may be selected. In the example shown in the figure, up to six topics may be specified.

The schematic illustration in FIG. 5C indicates the next step for registration is to optionally specify subtopics and keywords. Preferably, the form presents a list of subtopics pertinent to each designated topic from which the individual may select to further refine the designated topics of interest.

The schematic illustration in FIG. 5D indicates the next step for registration is to select a preferred format or layout for the newspaper. Preferably, the form presents a graphical representation of each possible layout and allows the individual to specify the size of the type font to use when the newspaper is subsequently displayed or printed.

The schematic illustration in FIG. 5E indicates the next step for registration is to specify a schedule for generation and delivery of the newspaper. In the example shown, the individual may request a newspaper each day, once each week, on weekdays only, or on weekends only. If a weekly schedule is specified, the individual is asked to also indicate the desired day of the week. The individual may also indicate the time of day and the pertinent time zone for generation and delivery.

The schematic illustration in FIG. 5F indicates the next step for registration is to specify an e-mail address for delivery, and to provide a "user id" and "password" so that the individual can review and change preferences in the future, yet protect these preferences against unauthorized access and modification.

The schematic illustration in FIG. 5G indicates the last step for registration is to review and optionally change the preferences, and to confirm the desire to register by clicking on the "Register" button. Alternatively, the individual may avoid registering by clicking on the "Cancel" button.

Registered individuals may use the form shown in FIG. 5G, or may use a form similar to it, to review and modify current preferences. By clicking "Change Topics" for example, news server 5 could present to the individual the forms shown in FIGS. 5B and 5C so that he or she could change the designated topics, subtopics and keywords. After the desired changes were made, news server 5 could present the form illustrated in FIG. 5G so that the individual could make additional changes. After all changes had been made, the individual could either click on "Register" to save the changes or click on "Cancel" to discard the changes and preserve the current preferences.

In a preferred implementation, an additional step is required to confirm registration. This step comprises news server 5 sending an e-mail message to the address specified in step 5, discussed above in connection with FIG. 5F. The body of this message asks the individual to return the message to the sender to confirm the registration. When news server 5 receives the message, the registration is confirmed and the subscription is processed according to the individual's preferences as stored in profile database 42. This additional step may be used to validate the e-mail address for subsequent newspaper deliveries.

C. Search for Content

Step 32 identifies documents and other information that are likely to have content most appealing to an individual by searching for the content that matches the indications of preferred topics stored as part of the individual's profile. In preferred implementations, an individual is allowed to enter preferred topics, subtopics and keywords.

Figure 6A:
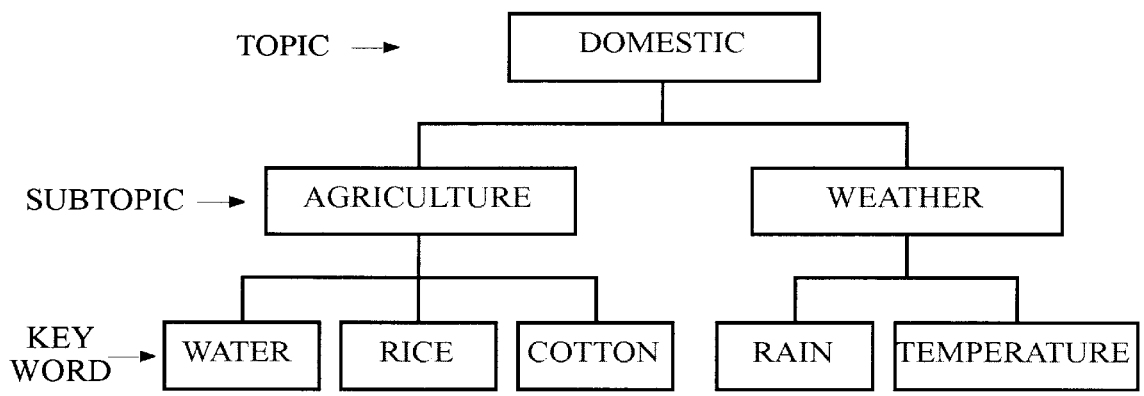
FIGS. 6A–6C are schematic illustrations of hypothetical relationships between categories, subcategories and keywords.
Figure 6B:
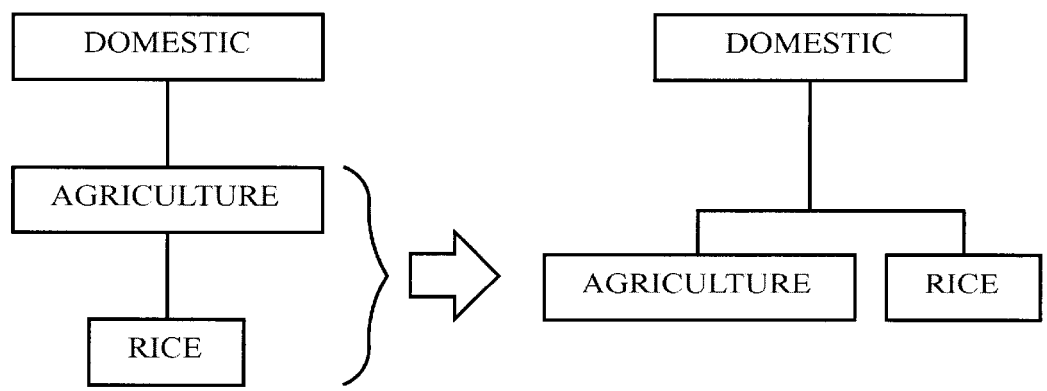
Figure 6C:
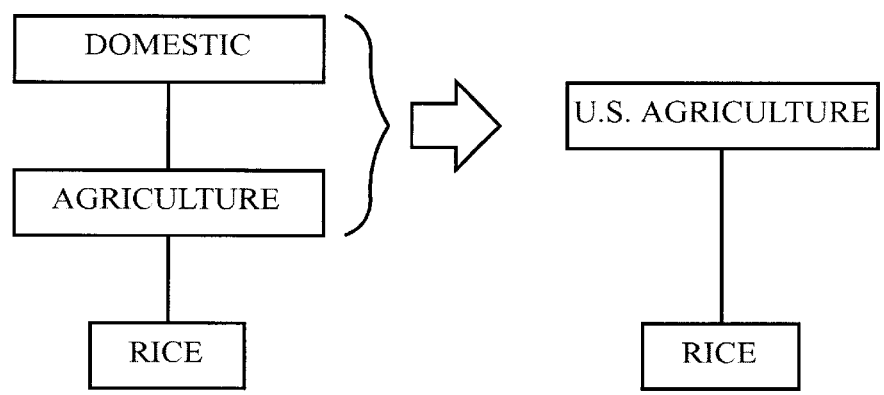
Figure 7:
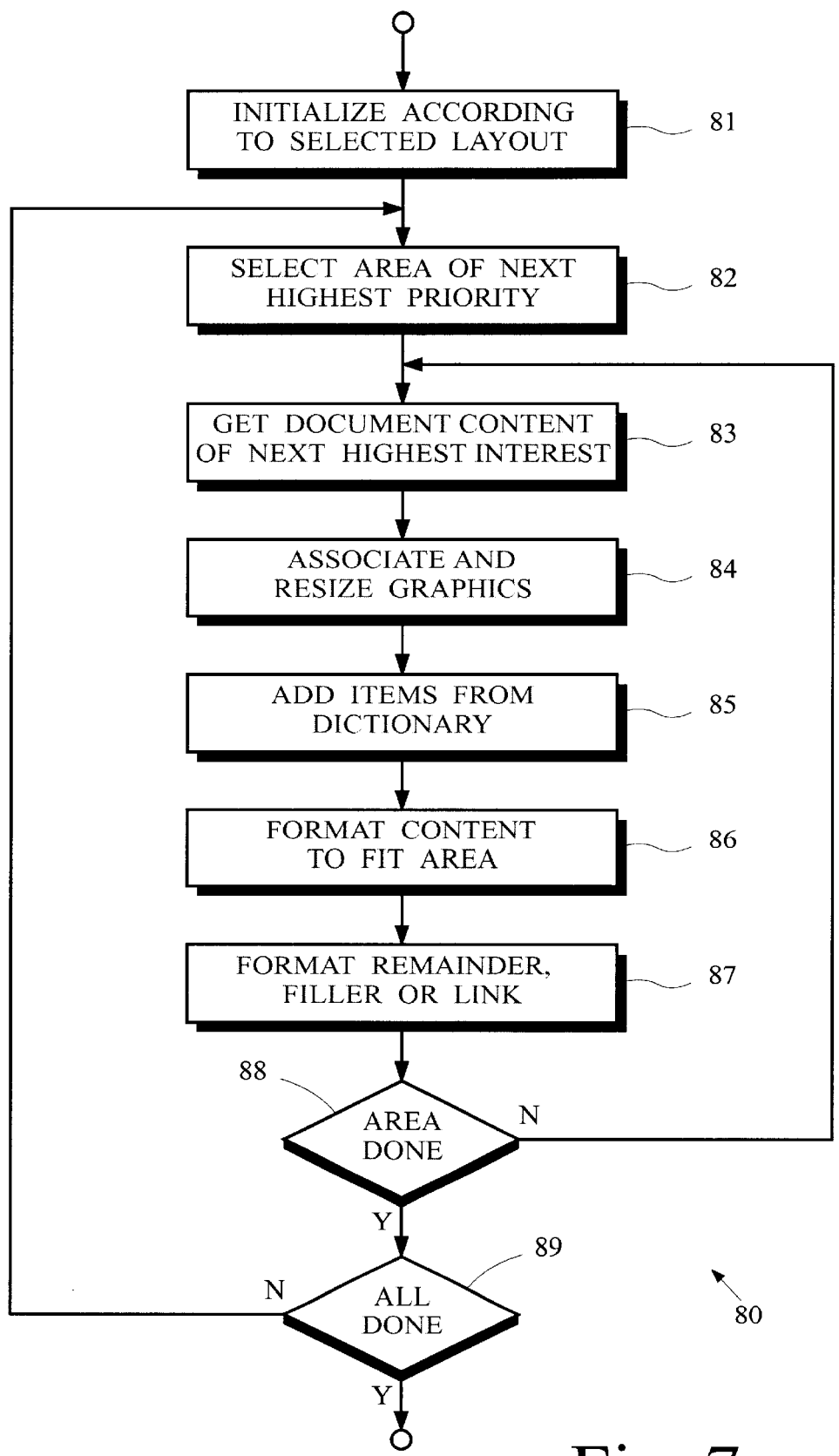
FIG. 7 is a block diagram of a process that may be used to generate a representation of document content according to a selected layout.

FIGS. 6A–6C are schematic illustrations of hypothetical relationships between topics, subtopics and keywords. The structure shown in FIG. 6A includes a designation of the "domestic" topic, which indicates a preference for domestic news. The structure includes designations for the "agriculture" and "weather" subtopics, which indicate a particular preference for domestic news related to agriculture and weather. Designations of keywords for "water," "rice" and "cotton" further refine the indicated preference for agricultural news, and designations of keywords for "rain" and "temperature" further refine the indicated preference for weather-related news.

The distinction between topics, subtopics and keywords is somewhat arbitrary. A classification that is classified as a subtopic in one implementation may be classified as a topic or a keyword in other implementations. No particular classification is critical to the present invention; however, in preferred implementations, preferred topics, subtopics and keywords are transformed into another hierarchical structure as necessary so that they conform to the searching and indexing requirements of the content stored in content database 44.

The searching and indexing requirements may vary according to the source of the content. For example, content obtained through subscription to Associated Press (AP) Online is classified according to a set of category codes specified by the American Newspaper Publishers Association (ANPA), and further classified according to a set of categories specified by AP Online. The ANPA categories are shown in Table I.

TABLE I

| ANPA Code | Category or Classification |
|---|---|
| a | Domestic |
| e | Entertainment |
| f | Financial/Business |
| i | International |
| p | Elections |
| q | Sports scoreboard and schedule |
| s | Sports stories, game summaries |
| v | Advisories |
| w | Washington |

The "domestic" topic designated in the hierarchical structure shown in FIG. 6A corresponds to the "Domestic" category provided by the ANPA specification; however, the remaining elements in the hierarchical structure do not all map to a respective AP Online classification. The AP Online set of classifications does not include any classification that is related specifically to the subtopic "agriculture" but it does include several classifications that are related to the subtopic "weather" as shown in Table II. There are no corresponding classifications for any of the keywords.

TABLE II

| AP Online Code | Category or Classification |
|---|---|
| 1201 | National weather and temperature tables |
| 1202 | Foreign temperature tables |
| 1204 | Other -- weather roundups |

FIG. 6B illustrates a mapping that may be used to transform part of the structure shown in FIG. 6A into a suitable set of search requirements for content received from AP Online. As shown, the designated topic "domestic" corresponds to an existing ANPA category but the designated subtopic "agriculture" and the designated keyword "rice," for example, are both mapped into keywords for searching. In other words, the specified preferences shown in FIG. 6A are transformed by the mapping illustrated in FIG. 6B into criteria that are suitable for searching content received from AP Online. According to this set of criteria, documents having content that is classified as "domestic" (ANPA code "a") are searched for occurrences of the words "agriculture" and "rice." In another implementation, synonyms and other words related to keywords could be included automatically in the search. For example, the keyword "farming" could be included in the search because it is related to "agriculture."

FIG. 6C illustrates another mapping that may be used with content that is classified according to a hypothetical scheme that includes a category for "U.S. agriculture." In yet another example not shown in the figures, all levels of hierarchical topics that are designated by an individual may need to be mapped to keywords, or to categories defined by the content provider. In preferred implementations, however, individual preferences are entered through forms that restrict the choice of topic and subtopic to classifications defined by the content provider.

One way in which this mapping may be carried out is to construct a table that cross-references all of the topics and subtopics that can be designated by an individual with the corresponding categories defined for the content. Multiple tables may be used if content is available from more than one source, or if content is available that is classified according to more than one classification scheme. A mapping to synonyms and other related words may be implemented in the same manner.

In one implementation, the transformation may be carried out by ignoring the designated topic and mapping the designated subtopic into a corresponding search category, provided a corresponding category is defined for the content to be searched. If the designated subtopic does not correspond to a defined category, the designated topic is mapped into the corresponding search category and the designated subtopic is treated as a keyword. After the preferred topics and subtopics designated by an individual have been mapped into a suitable set of criteria, a search for content in content database 44 may be easily carried out according to those criteria. No particular searching or indexing technique is critical.

The results of the search may be used to derive a measure of recipient satisfaction, which is an estimate of the degree to which a specific document has content that will appeal to an individual. Essentially any combination of several factors may be taken into account.

One factor is the relative priority of the topic. If an individual is allowed to rank topics such as that discussed above and shown in FIG. 5B, a document having content that pertains to the highest rated topic will be given a higher measure of satisfaction than will be given to a document with content that pertains to a lower ranked topic, all other factors being equal.

A second factor is whether a document has content that pertains to one or more subtopics. In one implementation, a document with content that pertains to a topic and one or more associated subtopics is given a higher measure of satisfaction that another document having content that pertains only to the topic but not a subtopic.

A third factor is the number of occurrences of keywords. Generally, a larger number of occurrences indicates a higher measure of satisfaction. Preferably, occurrences of keywords are either ignored or discounted if those keywords are associated with a topic or subtopic in the recipient's preferences that is not pertinent to the document content. In the example shown in FIG. 6A, the occurrences of the keyword "rice" in a document about weddings would not be given the same consideration as occurrences in documents having agricultural content.

A fourth factor is the location of keywords within a document. Preferably, a document having a keyword within a headline or possibly within the first paragraph of the body of the document, for example, is given a higher measure of satisfaction than a document having the keyword occur only at other locations.

D. Obtain Content

Step 33 obtains the content of the documents or other information that was identified by step 32. This may be accomplished very easily if the content itself is stored in content database 44. Alternatively or in addition, some content may reside elsewhere such as in a content server connected to network 1. In this situation, search requests may be submitted to the content server or it may be possible to service the search request using an index or other information structure immediately available to news server 5. For example, an index to a remote content server may be stored in content database 44. If a search identifies documents or other information on the content server that have content of interest to a recipient, that content may be retrieved by submitting a "get" or retrieval request to the content server. In response, the content server may return the requested content to news server 5 for use in preparing a newspaper. If permitted, the requested content may also be stored in content database 44 for subsequent use.

E. Format Content

Step 34 formats the content obtained by step 33 for presentation to the intended recipient. The form of the presentation is generated to conform to a preferred layout specified in the recipient profile.

The representation itself may be generated according to essentially any computer file format including the Portable Document Format (PDF), word processor formats such as WordPerfect® or Microsoft® Word, international facsimile formats, bit-mapped images, or native printer formats such as the Printer Control Language (PCL). In preferred implementations that generate representations for presentation on display device 26, the representation is generated in PDF. In alternative implementations that generate representations for presentation only by printer device 27, the representation is generated in a native printer format or in some encrypted form, described below.

1. Formatting Process

FIG. #7 is a block diagram of method 80, which represents one way in which step 34 may be carried out. Step 81 performs various initialization activities such as selecting the desired layout from layout database 46 and obtaining a list of areas in the selected layout that is ordered according to priority. Content of the document that is deemed to be of greatest interest to the intended recipient is to be formatted in the area having the highest priority. Document content deemed to be of progressively lower interest is formatted in areas having progressively lower priority.

Step 82 is part of an outer loop structure and is performed reiteratively. In the first iteration of this loop, step 82 selects the area that has the highest priority. In subsequent iterations, step 82 selects the area from the list that has the next highest priority. An area may be defined for multiple pages; however, in preferred implementations, each area is confined to one page.

Step 83 is part of an inner loop structure and is performed reiteratively to obtain the content of a respective document from a set of documents that are considered to be of interest to the intended recipient. In the first iteration, step 83 obtains the content of the document deemed to be of greatest interest to the recipient. In subsequent iterations, step 83 obtains the content of the document that is deemed to be of the next greatest interest.

Step 84 is an optional step that associates the selected document with one or more graphical objects such as pictures. This step is desirable in those implementations that format articles to include text and graphics from content of documents having either textual content or graphical content, but not both. The size of the graphical object is altered as necessary to optimize the use of space in the selected area of the layout. More than one graphical object may be associated.

Step 85 adds dictionary items to textual content. The dictionary items are provided for a specified language according to the reading proficiency of the recipient in the language of the document content.

Step 86 analyzes the combined content of the selected document, associated graphics and dictionary items to determine what portion can fit in the selected area of the layout. A representation of that portion is generated.

If a representation of the combined content of a document, graphics and dictionary items does not fill the selected area, step 87 obtains filler material to fill the remaining space in the area. If the representation of the combined content exceeds the space of the selected area, step 87 may generate a representation of all or some of the remaining content in another area, preferably on another page.

Step 88 determines whether the formatting process for the selected area is done. In some implementations, designated areas are allowed to include brief representations of more than one document. The inner loop structure provides for representations of multiple documents to be included in an area. If formatting for the selected area is not yet complete, the method continue with step 83, which obtains content of the next most important document. If processing for the area is complete, the method continues with step 89, which determines whether the processing for all formatting is complete. If not, the method continues with step 82, which selects the area having the next highest priority; otherwise, method 80 terminates.

Various aspects of method 80 are described below in more detail.

2. Selected Layout

FIGS. 8A to 8F provide schematic illustrations of several hypothetical layouts for the first page of a newspaper. In these examples, the portion labeled "BANNER" represents the name of the newspaper and any other information such as date that is independent of document content.

Figure 8A:
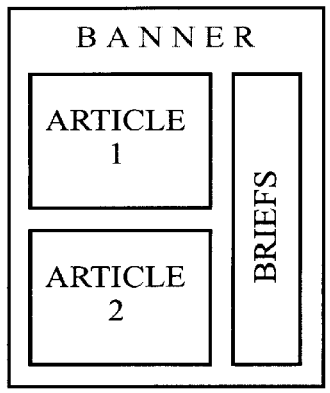
FIGS. 8A–8F are schematic illustrations of hypothetical layouts for a newspaper.
Figure 8B:
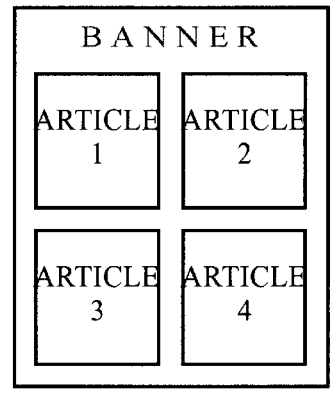
Figure 8C:
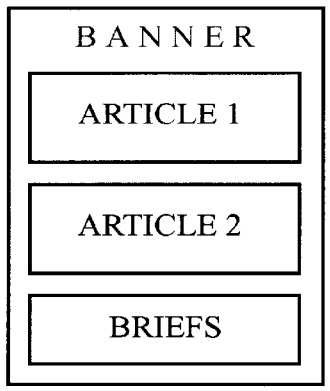
Figure 8D:
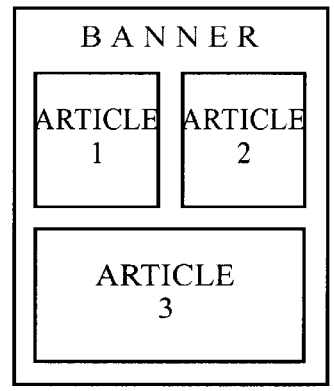

Referring to FIG. 8A, the area denoted "ARTICLE 1" represents a portion of the page in which all or part of the content of a first document is to be presented when displayed or printed. The area denoted "ARTICLE 2" represents a portion of the page in which all or part of the content of a second document is to be presented when displayed or printed. In preferred implementations, the first and second documents are the ones deemed to have the greatest and next greatest measures of satisfaction for the recipient, respectively. As mentioned above, a variety of techniques may be used to rank documents according to predicted measures of recipient interest or satisfaction. Alternatively, the documents may be presented in any arbitrary order such as by alphabetic order of document content title, date/time order specified by the content provider, or order in which the content is stored in content database 44.

The area denoted "BRIEFS" represents a portion of the page in which only a small part of each of multiple documents is to be presented. For example, "briefs" may present only the first paragraph of each document. In preferred implementations, the documents selected for presentation in the BRIEFS section are those documents that are deemed to be of less interest than the documents presented elsewhere on the page. An implementation may provide in each "brief" a Universal Resource Locator (URL) link to the full content of the document.

In preferred implementations, documents that have more content than can be presented in a designated area of a page may be processed in either of two basic ways. One way divides the document content into first and second parts such that a presentation of the first part fits in the designated area and all or a portion of the second part is presented on a subsequent page. Preferably, some indication such as "Go to page XX" is included with the presentation of the first part to refer to the page on which the second part is presented.

A second way divides the document content such that a presentation of a first part of the content fits in the designated area and the remaining content is omitted. Preferably, some indication of the omission such as "More" or "Remainder omitted" is included in the article presentation. A document name or some document-access information such as a URL link for the full content of the document may be provided.

Optionally, the recipient may be allowed to specify a maximum or preferred length of an article presentation, which could cause part of the second part to be omitted. If part is omitted, the presentation could include some indication of omission as described above. The length may be specified in essentially any manner such as the number of characters, number of lines, number of paragraphs, number of columns or column-inches, or number of pages.

A "maximum" article length specifies a certain limit on a presentation. A "preferred" article length allows some flexibility in the process that generates the presentation. For example, the length of an article presentation may be allowed to exceed a preferred length under certain conditions such as, for example, when document content can be presented in its entirety in a space that only slightly exceeds the preferred length by some specified margin, or when a document is given a very high measure of recipient satisfaction.

FIGS. 8B to 8F illustrate other layouts in which some provide areas denoted "ARTICLE 3" and "ARTICLE 4" for presenting the content of third and fourth documents in a manner similar to that described above for the first and second documents.

Figure 8E:
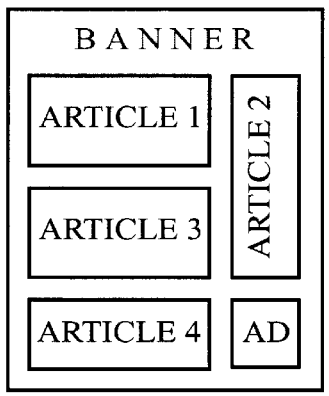
Figure 8F:
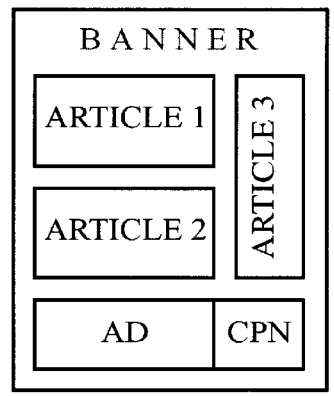

The layouts in FIGS. 8E and 8F include an area designated "AD" in which an advertisement or other notice may be presented. The content of this area may be selected in a manner that is independent of recipient preferences; however, preferably content is selected according to what is estimated to be of greater interest to the recipient. This selection may be based on individual preferences in the recipient profile.

The area designated "CPN" in the layout illustrated in FIG. 8F represents an area in which a coupon or rebate certificate may be presented to encourage the recipient to print the newspaper. For example, the CPN presentation could be a coupon that the recipient could use to obtain discounts or rebates for printing supplies such as paper, ink or toner. Preferably, the printed representation of the coupon or the business arrangement in which the coupon is used should discourage or prevent someone making or using photocopies of the coupon.

3. Graphical Content

Generally, content providers such as AP Online furnish documents that contain either text or graphical objects like pictures, but not both. In preferred implementations, a recipient is allowed to indicate a preference for a newspaper with all text and no graphics, with no text and all graphics, or with some intermediate mix of text and graphics. For those presentations that include graphics, a number of additional features can greatly improve the quality of the newspaper format.

The first feature uses the search results of step 32 to associate information with graphical content with other information having textual content. Many content providers like AP Online do not provide documents with both text and graphics; therefore, it is often necessary for news server 5 to make this association. One way in which this may be done is by searching the captions that often accompany graphical content in the same manner as is done for textual content, and to use the results of these searches to identify instances of text and graphic information that are closely related. The various measures of recipient satisfaction discussed above may be used to assess how closely graphical content is related to textual content.

The second feature adjusts the size of a graphical object to optimize the use of space in the presentation of a newspaper page. Generally, the presentation of a graphical object will not be satisfactory unless the ratio of height to width, sometimes referred to as the aspect ratio, is preserved. In preferred implementations, the width of a graphical object such as a picture is adjusted to match the width of one or more columns of text, and the height is adjusted to preserve the aspect ratio. In one implementation, the width of a graphical object is set equal to one less than the total number of columns used to present an article. If an article is formatted to print in three columns, for example, the width of an associated graphical object is set equal to the width of two columns and the height is set to preserve the original aspect ratio. In a second implementation, the width of a graphical object is set equal to the width of one column of text.

The third feature controls the number of graphical objects and/or the size of graphical objects according to recipient preferences. If a recipient indicates a higher or lower preference for graphical content, the size and/or number of objects is set higher or lower, respectively.

The fourth features allows the recipient to specify the desired spatial resolution of graphical and/or textual presentations to balance a number of competing factors such as the capacity of the representation that must be received and stored, the time and cost required to print the representation, and the subjective quality of the presentation. Another feature allows the recipient to specify whether a presentation includes color or is limited to a monochromatic or so called "black and white" representation.

4. Filling an Area

In preferred implementations, documents that have slightly less or slight more content than can be presented in a designated area of a page may be processed in a number of ways. One way increases or decreases the size of the type font to increase or decrease the amount of space needed for the presentation, respectively. Other ways increase or decrease the spacing between lines and or the size or margins.

In yet another way, a document having less content than can be presented in a designated area can be augmented by adding filler material to fill out the designated area. In this context, the term "filler material" refers to essentially any textual or graphical content that is not part of the document content. The content of the filler material may be related to the content of the document, but this is not required. The filler material could be a graphical object of arbitrary design, a picture that is related to the document in at least in a general way, textual material such as famous quotations, proverbs or facts, or an advertisement.

The filler material may be selected from a set of filler materials. The selection may be arbitrary or random, or it may be made on the basis of some criterion such as the size or aspect ratio of the material, or one or more recipient preferences. For example, an individual may be allowed to indicate a preference for graphical filler material as opposed to textual filler material. Each filler material in the set of filler materials may also be classified according to one or more categories and selected on the basis of recipient preferences for topics, subtopics, and keywords in a manner similar to the way in which document content is selected.

5. Foreign Language Dictionary

The growing use of global networks means recipients are more likely to be exposed to documents having textual content written in a language that they cannot easily understand. In one implementation, each recipient is allowed to indicate his or her preferred language and an indication of proficiency with one or more other languages. For example, a recipient could indicate his preferred language is German and he has less than a college level of proficiency with English and less than a high-school level of proficiency with Japanese. An implementation of the present invention could then identify specific words in English- and Japanese-language documents according to the respective proficiency levels, and include in the representation of the document a German-language definition of the identified words. For example, a representation of a portion of an English-language document could be generated to include the following definitions for a recipient indicating less than a college level of proficiency with English:

Initially, the [docent: Dozent, Führer, Tourleiter] was irritated by the [sophistry: Sophismus] of the man at the rear of the tour group whose [specious: trügerisch, verfänglich] questions seemed to have no other purpose but to embarrass her. But her irritation soon gave way to [trepidity: Besorgnis] as the man's behavior became increasingly [truculent: aufsässig].

This feature may be implemented by constructing a dictionary table that cross-references corresponding words in each language of interest and includes an indication of proficiency level. For example, words in the table that correspond to the English word "perspicacious" could be given a college-level indication and words in the table that correspond to the English word "abrogate" could be given a high-school-level indication. A newspaper that is generated for a recipient who specifies less than a high-school level of proficiency in English would include dictionary items for both words, whereas a newspaper that is generated for a recipient who specifies less than a college level of proficiency in English would include a dictionary item for "perspicacious" but not a dictionary item for "abrogate."

F. Deliver and Present

Step 35 delivers representation of newspapers according to delivery preferences specified in each recipient's profile. Table III represents a portion of a few recipient profile records stored in profile database 42. In the example shown, the records are stored in order by user id. The example shown in the table represents delivery preferences for six hypothetical individuals. Any similarity with actual individuals is not intended. Referring to the record portion for the individual having the user id "Alice," the profile record specifies delivery each weekday Monday through Friday at 5:00 pm local time. The time zone for this individual is eight hours behind Coordinated Universal Time (UTC) or Greenwich Mean Time (GMT). The individual having the user id "Bartok" has requested delivery each Monday at 6:30 am local time in a time zone that is five hours behind UTC. Referring to the profile record for "Diyang," delivery is requested for each weekend Saturday and Sunday at 3:30 pm local time in the time zone that is seven hours ahead of UTC.

TABLE III

| User id | Destination | Schedule | Day | Time | Zone |
|---|---|---|---|---|---|
| Alice | ahk@e3r4.com | weekdays | | 5:00 pm | −8 |
| Bartok | ebh@eee.com | weekly | Mon. | 6:30 am | −5 |
| Chandra | 1639@kfue.net | daily | | 9:00 am | +0 |
| Diyang | diyan@srr.com | weekend | | 3:30 pm | +7 |
| Ebony | cre@qky.com | weekly | Wed. | 10:30 am | +1 |
| Jin | abc@xyz.com | daily | | 9:00 pm | +9 |

In preferred implementations, delivery is made according to delivery control information that is derived from the delivery preferences stored in profile database 42. Table IV illustrate one arrangement of delivery control information that may be derived from recipient profile delivery preferences. In this example, the delivery control information is arrange in order according to the specified delivery time expressed in absolute or UTC time. This absolute time may be derived by subtracting the time zone offset from the delivery time, as shown in Table III. For example, the absolute delivery time for "Bartok" may be derived by subtracting the time zone offset (−5 hours) from the specified delivery time (6:30 am), which yields 1130 hours.

TABLE IV

| UTC | Schedule | Day | User id | Destination |
|---|---|---|---|---|
| 0830 | weekend | | Diyang | diyang@srr.com |
| 0900 | daily | | Chandra | 1639Ekfue.net |
| 0930 | weekly | Wed. | Ebony | cre@qky.com |
| 1130 | weekly | Mon. | Bartok | ebh@eee.com |
| 1200 | daily | | Jin | abc@xyz.com |
| 2500 | weekdays | | Alice | ahk@e3r4.com |

In This particular implementation, the absolute delivery time is allowed to be less than zero and to exceed 2400 hours to account for differences in delivery day. For example, the absolute delivery time for "Alice" is shown to be 2500 hours, which represents 0100 hours the next day. Delivery for Alice is requested for 5:00 pm in time zone-8 on Monday through Friday. This is equivalent to delivery at 0100 hours UTC on Tuesday through Saturday, which may be expressed as 2500 hours UTC for Monday through Friday. This particular scheme simplifies the task of determining the correct day of delivery.

By arranging the delivery control information in order by absolute delivery time, news server 5 may more easily carry out search, formatting and delivery steps discussed above according to recipient specified delivery schedules. After the representation for a newspaper has been generated, news server 5 may deliver it to the intended recipient in essentially any manner such as conventional mail or e-mail; however, delivery by e-mail is generally preferred. Alternatively, the representation may be stored and made available for viewing or downloading in response to a request from the recipient.

G. Other Features

The various features discussed above may be used in a wide variety of combinations. A few additional features are discussed here that may be used in combination with the features discussed above.

According to one feature, an application executing in client computer system 7–9 receives a newspaper representation from news server 5 and automatically prints the representation on printer device 27. This application may be implemented in a variety of ways including as a component of client "browser" software that monitors and detects the arrival of downloaded information conveying the newspaper representation.

According to another feature, news server 5 generates a newspaper representation in a form that is intended for presentation by printer device 27 but, preferably, is not intended for presentation by display device 26. This may be accomplished in a variety of ways. Two are mentioned here.

One way, mentioned above, generates the presentation in a native printer format such as the Printer Control Language (PCL). The format may be printed easily using a printer device 27 that is compatible with the particular native format. If this way is used, preferred implementations include in the individual profile some designation of printer type so that the representation can be generated in the proper format.

Another way generates the presentation in an encrypted form that cannot be easily deciphered by conventional viewing programs for presentation on display device 26, but can be deciphered by components of printing systems such as printer driver software.

These implementations may generate representations of newspapers in which the bulk of document content may only be printed but include summaries or titles of articles that can be presented on display device 26. This arrangement would allow a recipient to review the summaries or titles before deciding whether to print the representation.

H. Revise Preferences

Method 30 may include an additional step that receives indications of recipient activity with respect to the formatted newspaper and revise profile information to reflect changes in a recipient's preferred topics, subtopics and keywords. In one implementation, an application that operates in recipient computer system 7–9 sends a message to network server 5 indicating which articles the recipient views or prints by display device 26 or printer device 27, respectively. These indications may be considered a measure of recipient interest and may be used to modify the relative priority of topics and subtopics in the recipient's profile. The step may also add and remove topics and subtopics.

In yet another implementation that provides links in a newspaper to document content that was omitted, news server 5 may revise recipient preferences in response to reports of the recipient using the links to access the omitted content.

We claim:

1. A method for providing a personalized presentation of news and information to a recipient comprising steps that perform the acts of:

obtaining preferences of the recipient, wherein the preferences include an indication of one or more preferred categories of subject matter content, an indication of dictionary-word choice, a preferred presentation layout including an indication of a relative amount text and graphic content to be included in the representation of articles and an indication of a destination;

searching for a plurality of documents each having content deemed to satisfy one or more criteria with respect to the one or more preferred categories of subject matter content;

obtaining content information that represents at least part of the content of the plurality of documents, wherein the content information includes text and graphic content;

generating an encrypted representation of articles including the content information such that a presentation of the representation by a device in a specified set of printing devices conforms to the preferred presentation layout by controlling relative size of the graphic content to achieve the relative amount of text and graphic content in the representation of articles, wherein the content information for at least one article is in a first language, and generating a dictionary in a second language for words selected from the content information, wherein words are selected for the dictionary according to the indication of dictionary-word choice; and sending the representation of articles by electronic transmission to the destination.

2. A method according to claim 1 that further comprises receiving the generated representation at the destination and automatically printing the presentation of the representation.

3. A method according to claim 1 wherein the preferences include an indication of preferred delivery schedule and the method comprises sending the representation of articles according to the preferred delivery schedule.

4. A method according to claim 3 that comprises constructing delivery control information from indications in the preferences of a plurality of recipients and ordering the delivery control information according to the preferred delivery schedules, wherein representations of articles are generated and sent according to content and order of the delivery control information.

5. A method according to claim 1 that comprises associating a document having graphical content with another document having textual content.

6. A method according to claim 1 wherein the content information for a respective document includes a graphical object having a size and an aspect ratio, and the step that generates the representation of articles modifies the content information to change the size but preserve the aspect ratio of the graphical object.

7. A method according to claim 6 wherein the presentation of the representation of an article comprises text arranged in a plurality of columns and the size of the graphical object is changed to span all but one of the plurality of columns.

8. A method according to claim 6 wherein the presentation of the representation of an article comprises text arranged in one or more columns and the size of the graphical object is changed to span one column.

9. A method according to claim 1 wherein the preferred presentation layout prescribes a section of a specified page in which one article of text is to be presented, and the step that generates the representation of articles divides the content information of an article into a first part and a second part that immediately follows the first part such that a presentation of the first part fits within the section of the specified page and a presentation of at least a portion of the second part is included on a subsequent page, wherein the presentation of the first part includes a reference to the subsequent page on which the second portion is to be presented.

10. A method according to claim 1 wherein the preferred presentation layout prescribes a section of a specified page in which one article of text is to be presented, and the step that generates the representation of articles includes in the representation only that part of the content information of an article whose presentation fits within the section of the specified page, wherein the presentation of the part of the content information includes an indication that some content information is omitted from the presentation.

11. A method according to claim 10 wherein the indication of omitted content comprises an identification of or access information to a document containing the omitted content.

12. A method according to claim 1 wherein the preferred presentation layout prescribes an area in which one article of text is to be presented, and wherein the method comprises:

selecting filler material from a set of of filler materials such that a presentation of the selected filler material with a respective article of text substantially fills the prescribed area; and generating the representation such that the presentation includes in the specified area the content information of the respective article of text and the selected filler material.

13. A method according to claim 12 wherein the filler material is selected according to its size or its aspect ratio.

14. A method according to claim 12 wherein the filler material is selected according to content of the filler material.

15. A method according to claim 14 wherein the filler material is selected also according to the preferences of the recipient.

16. A medium readable by a device and conveying one or more programs of instructions for execution by the device to perform a method for providing a personalized presentation of news and information to a recipient, wherein the method comprises:

obtaining preferences of the recipient, wherein the preferences include an indication of one or more preferred categories of subject matter content, an indication of dictionary-word choice, a preferred presentation layout including an indication of a relative amount text and graphic content to be included in the representation of articles and an indication of a destination;

searching for a plurality of documents each having content deemed to satisfy one or more criteria with respect to the one or more preferred categories of subject matter content;

obtaining content information that represents at least part of the content of the plurality of documents, wherein the content information includes text and graphic content;

generating an encrypted representation of articles including the content information such that a presentation of the representation by a device in a specified set of printing devices conforms to the preferred presentation layout by controlling relative size of the graphic content to achieve the relative amount of text and graphic content in the representation of articles, wherein the content information for at least one article is in a first language, and generating a dictionary in a second language for words selected from the content information, wherein words are selected for the dictionary according to the indication of dictionary-word choice; and sending the representation of articles by electronic transmission to the destination.

17. A medium according to claim 16 wherein the method further comprises receiving the generated representation at the destination and automatically printing the presentation of the representation.

18. A medium according to claim 16 wherein the preferences include an indication of preferred delivery schedule and the method comprises sending the representation of articles according to the preferred delivery schedule.

19. A medium according to claim 18 wherein the method comprises constructing delivery control information from indications in the preferences of a plurality of recipients and ordering the delivery control information according to the preferred delivery schedules, wherein representations of articles are generated and sent according to content and order of the delivery control information.

20. A medium according to claim 16 wherein the method comprises associating a document having graphical content with another document having textual content.

21. A medium according to claim 16 wherein the content information for a respective document includes a graphical object having a size and an aspect ratio, and the step that generates the representation of articles modifies the content information to change the size but preserve the aspect ratio of the graphical object.

22. A medium according to claim 21 wherein the presentation of the representation of an article comprises text arranged in a plurality of columns and the size of the graphical object is changed to span all but one of the plurality of columns.

23. A medium according to claim 21 wherein the presentation of the representation of an article comprises text arranged in one or more columns and the size of the graphical object is changed to span one column.

24. A medium according to claim 16 wherein the preferred presentation layout prescribes a section of a specified page in which one article of text is to be presented, and the step that generates the representation of articles divides the content information of an article into a first part and a second part that immediately follows the first part such that a presentation of the first part fits within the section of the specified page and a presentation of at least a portion of the second part is included on a subsequent page, wherein the presentation of the first part includes a reference to the subsequent page on which the second portion is to be presented.

25. A medium according to claim 16 wherein the preferred presentation layout prescribes a section of a specified page in which one article of text is to be presented, and the step that generates the representation of articles includes in the representation only that part of the content information of an article whose presentation fits within the section of the specified page, wherein the presentation of the part of the content information includes an indication that some content information is omitted from the presentation.

26. A medium according to claim 25 wherein the indication of omitted content comprises an identification of or access information to a document containing the omitted content.

27. A medium according to claim 16 wherein the preferred presentation layout prescribes an area in which one article of text is to be presented, and wherein the method comprises:

selecting filler material from a set of of filler materials such that a presentation of the selected filler material with a respective article of text substantially fills the prescribed area; and generating the representation such that the presentation includes in the specified area the content information of the respective article of text and the selected filler material.

28. A medium according to claim 27 wherein the filler material is selected according to its size or its aspect ratio.

29. A medium according to claim 27 wherein the filler material is selected according to content of the filler material.

30. A medium according to claim 29 wherein the filler material is selected also according to the preferences of the recipient.

31. An apparatus for providing a personalized presentation of news and information to a recipient comprising:

means for obtaining preferences of the recipient, wherein the preferences include an indication of one or more preferred categories of subject matter content, an indication of dictionary-word choice, a preferred presentation layout including an indication of a relative amount text and graphic content to be included in the representation of articles and an indication of a destination;

means for searching for a plurality of documents each having content deemed to satisfy one or more criteria with respect to the one or more preferred categories of subject matter content;

means for obtaining content information that represents at least part of the content of the plurality of documents, wherein the content information includes text and graphic content;

means for generating an encrypted representation of articles including the content information such that a presentation of the representation by a device in a specified set of printing devices conforms to the preferred presentation layout by controlling relative size of the graphic content to achieve the relative amount of text and graphic content in the representation of articles, wherein the content information for at least one article is in a first language, and generating a dictionary in a second language for words selected from the content information, wherein words are selected for the dictionary according to the indication of dictionary-word choice; and means for sending the representation of articles by electronic transmission to the destination.

32. The apparatus according to claim 31 that further comprises means for receiving the generated representation at the destination and automatically printing the presentation of the representation.

33. The apparatus according to claim 31 wherein the preferences include an indication of preferred delivery schedule and the method comprises means for sending the representation of articles according to the preferred delivery schedule.

34. The apparatus according to claim 33 that comprises means for constructing delivery control information from indications in the preferences of a plurality of recipients and means for ordering the delivery control information according to the preferred delivery schedules, wherein representations of articles are generated and sent according to content and order of the delivery control information.

35. The apparatus according to claim 31 that comprises means for associating a document having graphical content with another document having textual content.

36. The apparatus according to claim 31 wherein the content information for a respective document includes a graphical object having a size and an aspect ratio, and the means for generating the representation of articles modifies the content information to change the size but preserve the aspect ratio of the graphical object.

37. The apparatus according to claim 36 wherein the presentation of the representation of an article comprises text arranged in a plurality of columns and the size of the graphical object is changed to span all but one of the plurality of columns.

38. The apparatus according to claim 36 wherein the presentation of the representation of an article comprises text arranged in one or more columns and the size of the graphical object is changed to span one column.

39. The apparatus according to claim 31 wherein the preferred presentation layout prescribes a section of a specified page in which one article of text is to be presented, and the means for generating the representation of articles divides the content information of an article into a first part and a second part that immediately follows the first part such that a presentation of the first part fits within the section of the specified page and a presentation of at least a portion of the second part is included on a subsequent page, wherein the presentation of the first part includes a reference to the subsequent page on which the second portion is to be presented.

40. The apparatus according to claim 31 wherein the preferred presentation layout prescribes a section of a specified page in which one article of text is to be presented, and the means for generating the representation of articles includes in the representation only that part of the content information of an article whose presentation fits within the section of the specified page, wherein the presentation of the part of the content information includes an indication that some content information is omitted from the presentation.

41. The apparatus according to claim 40 wherein the indication of omitted content comprises an identification of or access information to a document containing the omitted content.

42. The apparatus according to claim 31 wherein the preferred presentation layout prescribes an area in which one article of text is to be presented, and wherein the apparatus comprises means for selecting filler material from a set of filler materials such that a presentation of the selected filler material with a respective article of text substantially fills the prescribed area; and means for generating the representation such that the presentation includes in the specified area the content information of the respective article of text and the selected filler material.

43. The apparatus according to claim 42 wherein the filler material is selected according to its size or its aspect ratio.

44. The apparatus according to claim 42 wherein the filler material is selected according to content of the filler material.

45. The apparatus according to claim 44 wherein the filler material is selected also according to the preferences of the recipient.

\* \* \* \* \*